United States Patent
Kim et al.

(10) Patent No.: US 9,102,366 B1
(45) Date of Patent: Aug. 11, 2015

(54) FRONT SPOILER APPARATUS FOR VEHICLE

(71) Applicant: Hyundai Motor Company, Seoul (KR)

(72) Inventors: Hak Lim Kim, Hwaseong-si (KR);
Hyun Gyung Kim, Hwaseong-si (KR);
Jun Sik Shin, Anyang-si (KR)

(73) Assignee: HYUNDAI MOTOR COMPANY, Seoul (KR)

(*) Notice: Subject to any disclaimer, the term of this patent is extended or adjusted under 35 U.S.C. 154(b) by 0 days.

(21) Appl. No.: 14/480,380

(22) Filed: Sep. 8, 2014

(30) Foreign Application Priority Data

May 2, 2014 (KR) .......................... 10-2014-0053483

(51) Int. Cl.
*B62D 35/00* (2006.01)

(52) U.S. Cl.
CPC ..................... *B62D 35/005* (2013.01)

(58) Field of Classification Search
CPC ....................................................... B62D 35/005
USPC ................ 296/180.1, 180.5, 187.04; 180/903
See application file for complete search history.

(56) References Cited

U.S. PATENT DOCUMENTS

| | | | | |
|---|---|---|---|---|
| 3,618,998 A | * | 11/1971 | Swauger ..................... | 296/180.5 |
| 4,131,308 A | * | 12/1978 | Holka et al. ................ | 296/180.5 |
| 4,398,764 A | * | 8/1983 | Okuyama ................... | 296/180.1 |
| 4,457,558 A | * | 7/1984 | Ishikawa .................... | 296/180.5 |
| 4,489,806 A | * | 12/1984 | Shimomura ................. | 180/313 |
| 4,558,897 A | * | 12/1985 | Okuyama et al. ........... | 296/180.5 |
| 4,659,130 A | * | 4/1987 | Dimora et al. .............. | 296/180.1 |
| 4,778,212 A | * | 10/1988 | Tomforde ................... | 296/180.1 |
| 2004/0113457 A1 | * | 6/2004 | JaCquemard et al. ...... | 296/180.1 |
| 2007/0216194 A1 | * | 9/2007 | Rober et al. ................ | 296/180.1 |
| 2011/0187151 A1 | * | 8/2011 | Mackenzie et al. ......... | 296/180.5 |
| 2014/0076645 A1 | * | 3/2014 | McDonald et al. .......... | 180/68.1 |

FOREIGN PATENT DOCUMENTS

| | | |
|---|---|---|
| JP | 07-137669 A | 5/1995 |
| JP | 2006-175888 A | 7/2006 |
| JP | 2013-193546 A | 9/2013 |
| KR | 10-2002-0079001 A | 10/2002 |
| KR | 10-2004-0014780 A | 2/2004 |

* cited by examiner

*Primary Examiner* — Jason S Morrow
(74) *Attorney, Agent, or Firm* — Morgan, Lewis & Bockius LLP

(57) ABSTRACT

A front spoiler apparatus for a vehicle may include a spoiler panel, a rear end of which is rotatably connected to a bottom surface of a front bumper such that the spoiler panel is rotatable up/downward, a guide cylinder that is arranged to pass through the bottom surface of the front bumper to be fixed to the front bumper, a piston that is arranged within the guide cylinder and moves along the guide cylinder, a guide rod that is arranged to connect a front end of the spoiler panel and the piston, and an elastic member that is arranged within the guide cylinder and provides elastic force to rotate the spoiler panel toward the front bumper.

11 Claims, 4 Drawing Sheets

FRONT SPOILER APPARATUS FOR VEHICLE

CROSS REFERENCE TO RELATED APPLICATION

The present application claims priority of Korean Patent Application Number 10-2014-0053483 filed on May 2, 2014, the entire contents of which application are incorporated herein for all purposes by this reference.

BACKGROUND OF INVENTION

1. Field of Invention

The present invention relates to a front spoiler apparatus for a vehicle, and more particularly, to a front spoiler apparatus for a vehicle of which the protruding amount is varied actively in line with a vehicle speed.

2. Description of Related Art

Generally, a vehicle receives air-resistant force through collision with atmospheric air while it travels wherein the air-resistant force is classified as a drag and lift. The drag is the resistant force that acts opposite to the motion direction of a vehicle body that is collided directly with air while it travels and the lift is the force that lifts a vehicle body by pressure difference created between top and bottom of a vehicle body while it travels. Accordingly, attachments are necessary for a vehicle so as to improve the aerodynamic performance and fuel efficiency by reducing the drag and the lift, and a spoiler belongs to the attachments, which serves to vary the air flow and is called as an air spoiler.

Meanwhile, a front spoiler installed on a front of a vehicle (which is called as other names such as nose spoiler, air dam, air dam skirts or the like) serves to reduce the drag and improve aerodynamic performance by decreasing the amount of air that is introduced into an under body through a front bumper when a vehicle travels at a high speed.

In a front spoiler apparatus disclosed in a conventional art, an upper panel is fixed to a bottom of a front bumper in a road surface direction, a lower panel is rotatably connected to an end of the upper panel through a hinge, and the lower panel and the front bumper are connected through a spring wherein the drag is reduced through the lower panel while a vehicle travels without obstacles on a road surface thereby to improve driving safety and fuel efficiency and when there is an obstacle on a road surface, the lower panel rotates in the opposite direction of the travelling direction when the lower panel contacts the obstacle (over-speed prevention step, recess or the like) and returns after passing through the obstacles.

However, according to the conventional art, the lower panel constructing a spoiler contacts repeatedly the obstacle on a road surface thereby to produce noise and cause breakage damage due to durability decreasing.

In another front spoiler apparatus disclosed in another conventional art, it is provided with a controller for receiving signals regarding a driving speed of a vehicle, a motor that is driven by the control signal from the controller, a gear that is operated with power transmitted from the motor, and a movable plate (spoiler) that rotates through the operation of the gear wherein the movable plate is protruded to a lower side of a front bumper or inserted into the inside of the front bumper by controlling the operation of the motor in accordance with the speed of a vehicle.

However, according to the conventional front spoiler apparatus as configured above, it needs actuators such as a controller, a motor, a gear and the like and thus its weight increases deteriorates fuel efficiency and increases cost.

In another conventional front spoiler apparatus as shown in FIG. 1, an air input hole 2 is formed through a front bumper 1, a support wall 4 having a cavity 3 inside the front bumper 1 corresponding to the air input hole 2 is formed, and a spoiler 6 provided with a water pressure plate 5 in the cavity 3 is installed through a spring 7 wherein the spoiler 6 moves to an upper side of the cavity 3 by elastic force of the spring 7 at a low speed to reduce the protruding amount of the spoiler 6, and the spoiler 6 overcomes the force from the spring 7 and is protruded to a lower side of the bumper at a high speed since the pressure of a driving wind (i.e. the wind to be generated against the car body when driving) is transmitted to the water pressure plate 5.

However, according to the conventional configuration as described above, the air input hole 2 is formed through the front bumper 1 and thus its aesthetic appearance is poor and there is a limitation to designing the front bumper 1 due to the air input hole 2.

Further, when a vehicle passes through the obstacle (recess) on a road surface while the vehicle travels at a low speed or when a wind pressure applies to the spoiler 6 while a vehicle travels at a high speed, the spoiler 6 vibrates in accordance with an elastic deformation of the spring 7. At this time, there is no configuration for damping the vibration of the spoiler 6 in the conventional apparatus and thus the vibration of the spoiler 6 is transmitted through the support wall 4, thereby producing vibration noise.

Additionally, according to a conventional front spoiler apparatus, the spoiler 6 that is protruded to a lower side of a bumper returns rapidly while it moves upward through the elastic force of the spring 7 when a vehicle brakes suddenly while the vehicle travels at a high speed, and at this time the water pressure plate 5 of the spoiler 6 collides directly and strongly with the support wall 4, thereby producing noise and weakening durability.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention provides a front spoiler apparatus for a vehicle in which the protruding amount thereof from a front bumper is varied actively in line with the vehicle speed and the spoiler panel is prevented from being in contact with an obstacle on a road surface when a vehicle travels, thereby preventing noise production and breakage of the spoiler panel due to the obstacle.

Further, the present invention is to provide a front spoiler apparatus for a vehicle that is simply configured without using actuators such as a sensor, a controller, a motor and a gear, thereby reducing weight and improving fuel efficiency and saving cost.

Further, the present invention is to provide a front spoiler apparatus for a vehicle, in which a hole for inputting air is not formed through the front bumper, thereby improving aesthetic appearance and increasing freedom degree of designing the front bumper, and the vibration of the spoiler is dampened, thereby removing the vibration noise, and reducing the noise produced when the spoiler returns and improving durability thereof.

In various aspects, the present invention provides a front spoiler apparatus for a vehicle including: a spoiler panel a rear end of which is rotatably connected to a bottom surface of a front bumper such that the spoiler panel is rotatable up/downward; a guide cylinder that is arranged to pass through the bottom surface of the front bumper to be fixed to the front bumper; a piston that is arranged within the guide cylinder and moves along the guide cylinder; a guide rod that is arranged to connect a front end of the spoiler panel and the piston; and an elastic member that is arranged within the guide cylinder and provides elastic force to rotate the spoiler panel toward the front bumper.

The front spoiler apparatus for a vehicle may further include an upper stopper and a lower stopper which are fixed to an upper end and a lower end of the guide cylinder, respectively, and restrict movement of the piston. The front/rearward length of the spoiler panel may be formed to be shorter than a front/rearward length of the front bumper such that a front end of the spoiler panel may not be protruded beyond a front side of the front bumper. The rear end of the spoiler panel may be rotatably connected to a bottom rear end of the front bumper through a hinge shaft.

The guide cylinder and the guide rod may be arranged to form an arc shape along a rotation radius of the spoiler panel. A plurality of air passages that pass through top and bottom surfaces of the piston may be formed through the piston. The piston may be made of rubber so as to prevent noise and absorb vibration of the spoiler panel.

The elastic member may be a compression spring one end of which is supported on the piston and the other end of which is supported on the lower stopper. An orifice may be formed through the upper stopper to be connected to an outside so as to damp pneumatically vibration of the spoiler panel. A rubber packing may be integrally connected to a bottom surface of the lower stopper to be in contact with the spoiler panel so as to absorb impact and vibration, and prevent noise. The piston may not contact with the upper stopper so as to prevent impact, vibration and noise when the spoiler panel is in close contact with the bottom surface of the front bumper.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

The above and other features of the present invention will now be described in detail with reference to certain exemplary embodiments thereof illustrated by the accompanying drawings which are given herein below by way of illustration only, and thus are not limitative of the present invention, and wherein.

Figure 1:
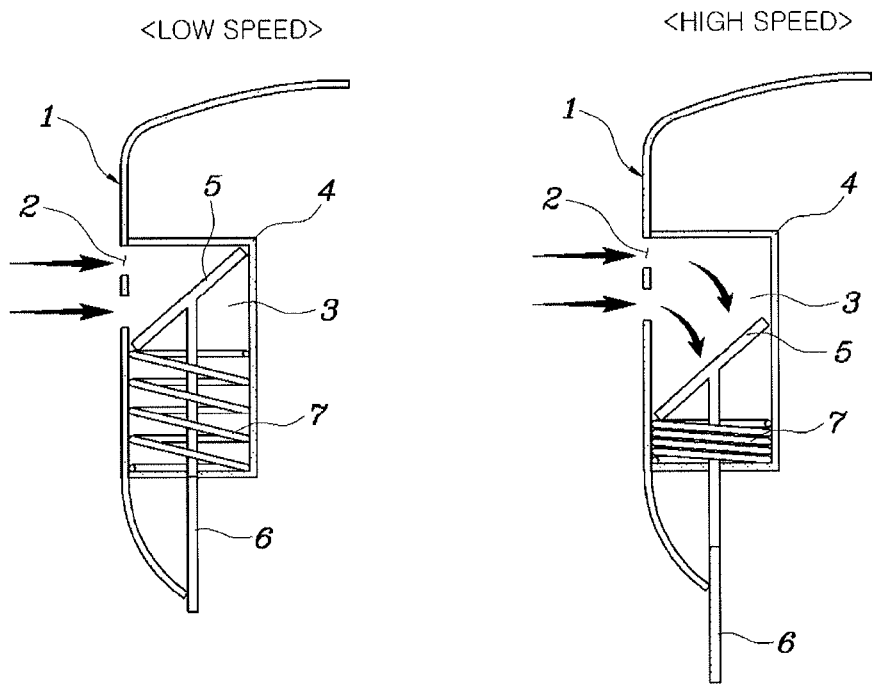
FIG. 1 is a cross-sectional view illustrating a front spoiler apparatus according to a related art.

It should be understood that the appended drawings are not necessarily to scale, presenting a somewhat simplified representation of various preferred features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As shown in FIGS. 2 to 7, a front spoiler apparatus of the present invention may include: a spoiler panel 13 a rear end of which is rotatably connected up/downward to a bottom surface of a front bumper 11; a guide cylinder 15 that is arranged to pass through a bottom surface of the front bumper 11; a piston 17 that is arranged within the guide cylinder 15 and moves along the guide cylinder 15; a guide rod 19 that is arranged to connect a front end of the spoiler panel 13 and the piston 17; and an elastic member 21 that is arranged within the guide cylinder 15 and provides elastic force to rotate the spoiler panel 13 toward the front bumper 11.

Further, a front spoiler apparatus of the present invention may further include an upper stopper 23 and a lower stopper 25 which are fixed to an upper end and a lower end of the guide cylinder 15, respectively and restrict the up/down movement of the piston 17.

Meanwhile, a front/rearward length L1 of the spoiler panel 13 may be formed to be shorter than a front/rearward length L2 of the front bumper 11 such that a front end of the spoiler panel 13 is not protruded to a front side of the front bumper 11, thereby improving aesthetic appearance and further preventing contact with a front vehicle or a front obstacle.

According to the present invention, a rear end of the spoiler panel 13 is rotatably connected upward/downward to a bottom rear end of the front bumper 11 through a hinge shaft 27 and thus a front end of the spoiler panel 13 rotates upward/downward around the hinge shaft 27.

Here, the guide cylinder 15 and the guide rod 19 may be arranged to form an arc shape along a rotation radius of the spoiler panel 13 such that the spoiler panel 13 rotates smoothly around the hinge shaft 27.

Further, a plurality of air passages 17a that pass through the top and bottom surfaces of the piston 17 may be formed through the piston 17, and if there is not provided with the air passage 17a, the piston 17 does not move smoothly along the guide cylinder 15 and in this case the open and close operations of the spoiler panel 13 may not be performed smoothly. In order to solve this problem the air passage 17a may be formed through the piston 17.

Meanwhile, in addition to the air passage 17a, a diameter of the piston 17 may be formed to be slightly smaller than an inner diameter of the guide cylinder 15 thereby to form a gap between the piston 17 and the guide cylinder 15. However, in this case when the gap between the piston 17 and the guide cylinder 15 is formed to be excessively great, the piston 17 may not perform a pneumatic damping operation when the spoiler panel 13 is opened and closed, thereby producing noise due to vibration and impact.

Further, the piston 17 may be made of rubber so as to prevent noise when the spoiler panel 13 is opened and closed and further absorbs vibration of the spoiler panel 13, but it is not limited thereto.

The elastic member 21 is a compression spring one end of which is supported on the piston 17 and the other end of which is supported on the lower stopper 25.

Here, an orifice 23a is formed through the upper stopper 23 to be connected to the outside so as to damp pneumatically the vibration of the spoiler panel 13.

The spoiler panel 13 vibrates in accordance with variations of the elastic force of the elastic member 21 when a vehicle passes through an obstacle (recess) on a road surface while it travels at a low speed, or the spoiler panel 13 vibrates by the wind pressure while a vehicle travels at a high speed, wherein the orifice 23a serves to damp pneumatically the movement of the piston 17 when the spoiler panel 13 vibrates, thereby improving greatly vibration noise.

Figure 4:
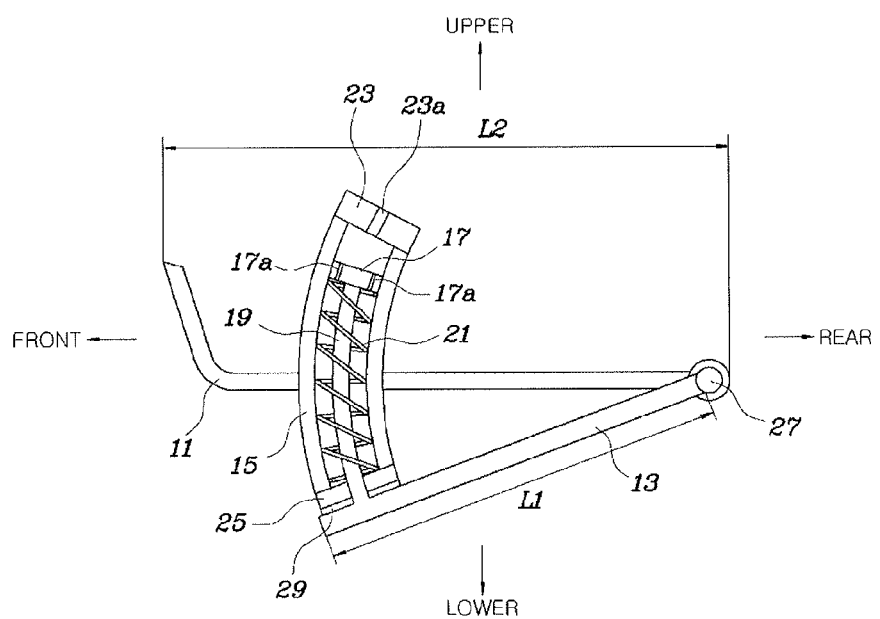
FIG. 4 is a cross-sectional view illustrating a front spoiler apparatus of FIG. 3.
Figure 7:
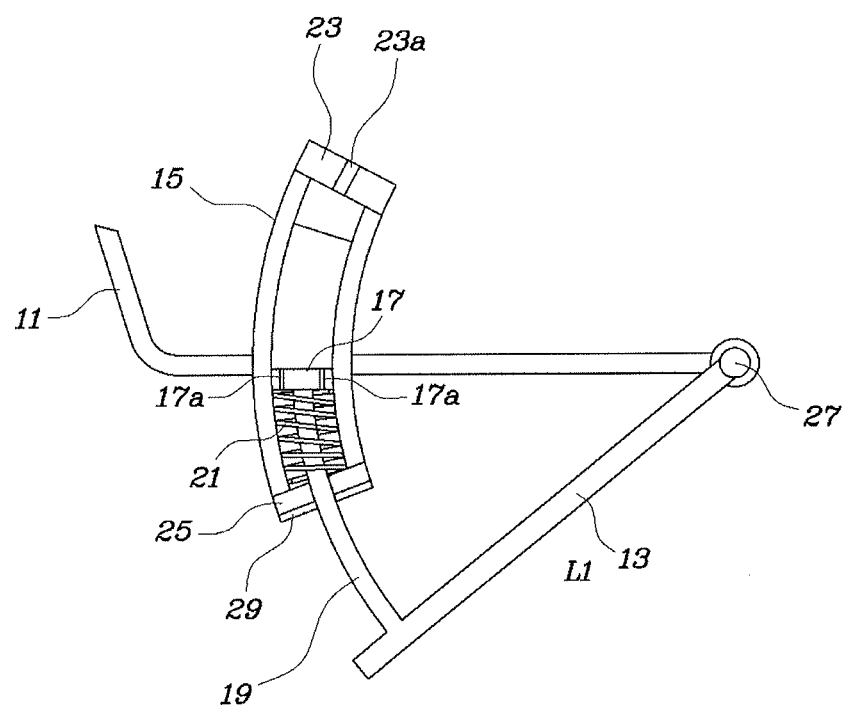
FIG. 7 is a cross-sectional view illustrating a front spoiler apparatus of FIG. 5.

Further, the orifice 23a serves to discharge air within the guide cylinder 15 to the outside when the opening stage of the spoiler panel 13 as shown in FIG. 7 is converted into the close state thereof as shown in FIG. 4 thereby to move slowly the piston 17, thereby preventing a sudden return operation, impact and vibration of the spoiler panel 13 and further improving durability thereof.

Additionally or optionally, a rubber packing 29 may be integrally connected to a bottom surface of the lower stopper 25 to be in contact with the spoiler panel 13 so as to absorb vibration and prevent noise, and the packing may be made of various materials.

Further, the piston 17 may not be in contact with the upper stopper 23 so as to prevent impact, vibration and noise when the spoiler panel 13 is closed, thereby contributing to improve durability of the piston 17 and the upper stopper 23.

Hereinafter, the operation of the present embodiment will be described.

Figure 2:
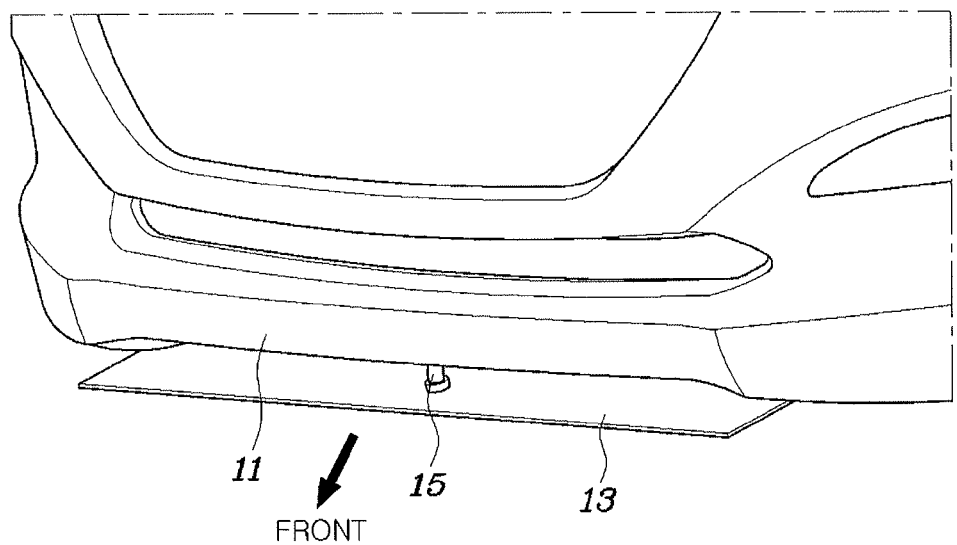
FIG. 2 is a perspective view illustrating a front bumper where an exemplary front spoiler apparatus is installed according to the present invention and a spoiler panel is closed.
Figure 3:
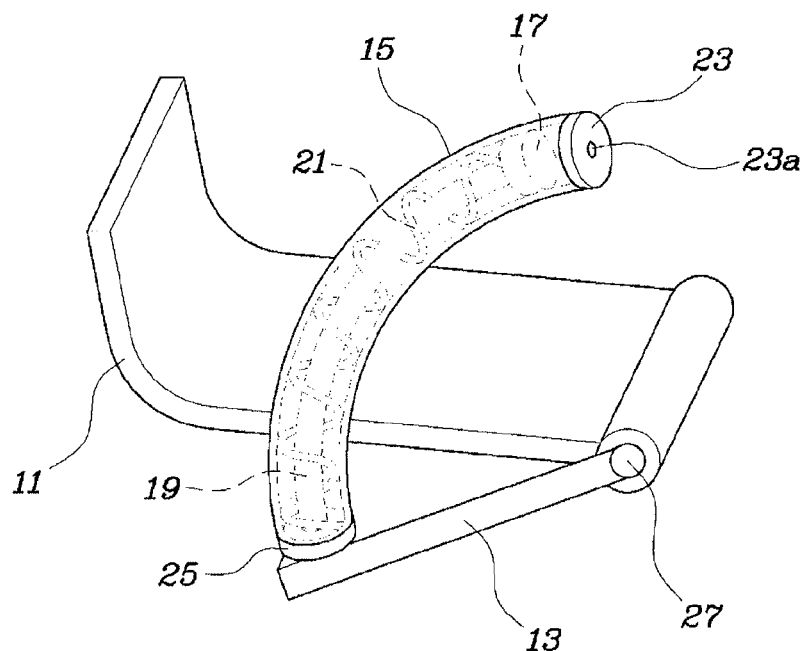
FIG. 3 is an enlarged view illustrating a front spoiler apparatus of FIG. 2.

The state shown in FIGS. 2 to 4 is a stop state or a low speed driving state of a vehicle. At this time, the spring force of the elastic member 21 is greater than the pressure of the driving wind and thus the spoiler panel 13 is kept to be in close contact with the bottom surface of the front bumper 11 in a close state.

Accordingly, in the slow speed driving state, even though there is an obstacle (over-speed prevention step, recess or the like) on a road surface, the spoiler panel 13 is in close contact with the bottom surface of the front bumper 11 and thus it might not be able to contact the obstacle, thereby preventing noise production and breakage of the spoiler panel 13 due to the obstacle on a road surface, and further improving durability of a front spoiler apparatus including the spoiler panel 13.

When a vehicle passes through an obstacle (recess) on a road surface in the closed state of the spoiler panel 13, the spoiler panel 13 vibrates in accordance with variation of the elastic force of the elastic member 21, and at this time the movement of the piston 17 is dampened pneumatically through the elastic force of the elastic member 21 and the air discharged through the orifice 23a, thereby restricting the vibration of the spoiler panel 13 and improving further vibration noise.

Figure 5:
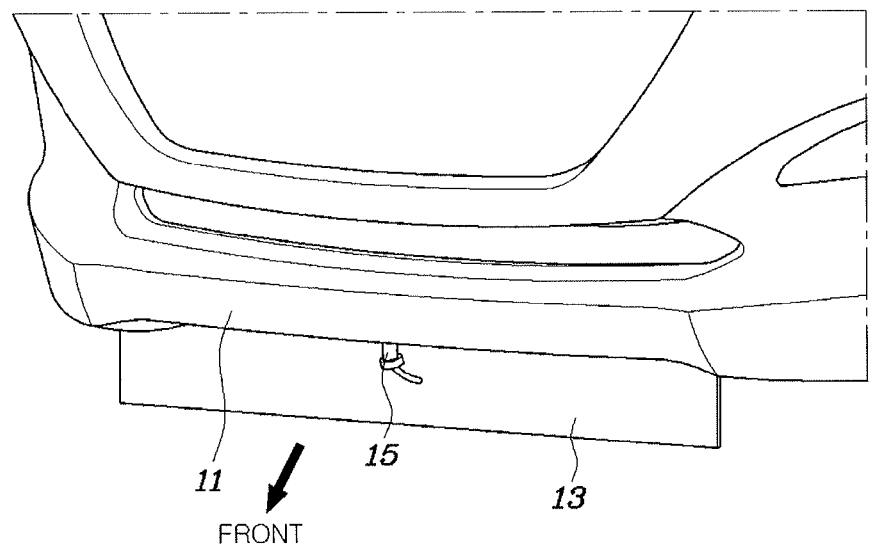
FIG. 5 is a perspective view illustrating a front spoiler apparatus in an operation state, wherein a spoiler panel is opened toward a lower side of a front bumper.
Figure 6:
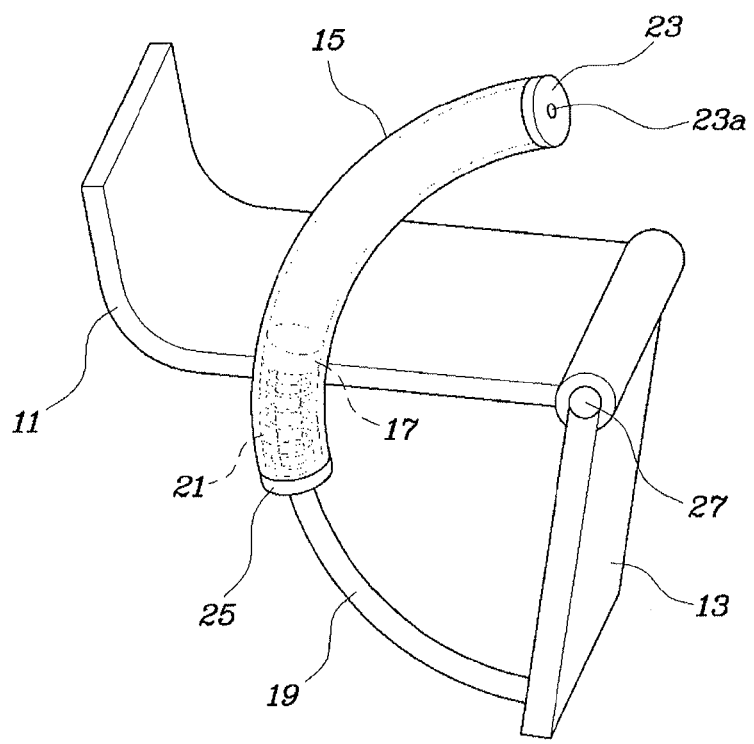
FIG. 6 is an enlarged view illustrating a front spoiler apparatus of FIG. 5.

The states shown in FIGS. 5 to 7 are in a high speed driving state wherein the pressure of the driving wind is greater than the spring force of the elastic member 21. Accordingly, the spoiler panel 13 that is in close contact with the bottom surface of the front bumper 11 rotates around the hinge shaft 27 by the wind pressure and its front end is protruded to a lower side of the front bumper to become an open state.

When the spoiler panel 13 becomes the open state, the elastic force of the elastic member 21 is accumulated while it is compressed and the amount of air that is introduced to the under body is decreased to reduce the lift, thereby improving aerodynamic performance and fuel efficiency of a vehicle.

The spoiler panel 13 vibrates by the wind pressure when driving at a high speed in the open state of the spoiler panel 13 and at this time the movement of the piston 17 is dampened pneumatically through the air discharged through the orifice 23a, thereby restricting the vibration of the spoiler panel 13 and improving the vibration noise.

Further, when the open state of the spoiler panel 13 is converted into the close state thereof in accordance with conversion from the high speed driving state into the low speed driving state, a return force of the elastic member 21 applies and further the piston 17 moves slowly since the air within the guide cylinder 15 is discharged through the orifice 23a, and as a result the sudden return operation of the spoiler panel 13 is prevented in advance, thereby preventing impact and vibration of the spoiler panel 13 and further improving durability thereof.

According to a front spoiler apparatus of the present invention, the protruding amount thereof from a front bumper is varied actively in line with the vehicle speed and the spoiler panel is prevented from being in contact with an obstacle on a road surface when a vehicle travels at a low speed, thereby preventing noise production and breaking of the spoiler panel due to the obstacle, and the vibration and noise of the spoiler panel by the wind pressure are removed when a vehicle travels at a high speed.

Further, according to present invention a front spoiler apparatus is configured simply without using actuators such as a sensor, a controller, a motor and a gear, thereby reducing weight and saving cost.

Further, according to a front spoiler apparatus of the present invention, a hole for inputting air is not formed through the front bumper 11, thereby improving aesthetic appearance and increasing the degree of freedom when designing the front bumper.

For convenience in explanation and accurate definition in the appended claims, the terms "upper" or "lower", "front" or "rear", "top" and "bottom", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A front spoiler apparatus for a vehicle comprising:
   - a spoiler panel a rear end of which is rotatably connected to a bottom surface of a front bumper such that the spoiler panel is rotatable up/downward;
   - a guide cylinder that is arranged to pass through the bottom surface of the front bumper to be fixed to the front bumper;
   - a piston that is arranged within the guide cylinder and moves along the guide cylinder;
   - a guide rod that is arranged to connect a front end of the spoiler panel and the piston; and
   - an elastic member that is arranged within the guide cylinder and provides elastic force to rotate the spoiler panel toward the front bumper.

2. The apparatus of claim 1, further comprising:
   an upper stopper and a lower stopper which are fixed to an upper end and a lower end of the guide cylinder, respectively, and restrict movement of the piston.

3. The apparatus of claim 1, wherein a front/rearward length of the spoiler panel is shorter than a front/rearward length of the front bumper such that a front end of the spoiler panel is not protruded beyond a front side of the front bumper.

4. The apparatus of claim 1, wherein the rear end of the spoiler panel is rotatably connected to a bottom rear end of the front bumper through a hinge shaft.

5. The apparatus of claim 1, wherein the guide cylinder and the guide rod are arranged to form an arc shape along a rotation radius of the spoiler panel.

6. The apparatus of claim 1, wherein a plurality of air passages that pass through top and bottom surfaces of the piston are formed through the piston.

7. The apparatus of claim 1, wherein the piston is made of rubber so as to prevent noise and absorb vibration of the spoiler panel.

8. The apparatus of claim 2, wherein the elastic member is a compression spring one end of which is supported on the piston and the other end of which is supported on the lower stopper.

9. The apparatus of claim 2, wherein an orifice is formed through the upper stopper to be connected to an outside so as to damp pneumatically vibration of the spoiler panel.

10. The apparatus of claim 2, wherein a rubber packing is integrally connected to a bottom surface of the lower stopper to be in contact with the spoiler panel so as to absorb impact and vibration, and prevent noise.

11. The apparatus of claim 2, wherein the piston is not in contact with the upper stopper so as to prevent impact, vibration and noise when the spoiler panel is in close contact with the bottom surface of the front bumper.

* * * * *